(12) United States Patent
Feith et al.

(10) Patent No.: US 12,547,832 B2
(45) Date of Patent: Feb. 10, 2026

(54) NEXT AST BRANCH PREDICTION AND NEXT TOKEN PREDICTION JOINT PRE-TRAINING TASK FOR CODE GENERATIVE MODELS

(71) Applicant: Oracle International Corporation, Redwood Shores, CA (US)

(72) Inventors: Tomas Feith, Zurich (CH); Arno Schneuwly, Effretikon (CH); Saeid Allahdadian, Vancouver (CA); Matteo Casserini, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 18/394,140

(22) Filed: Dec. 22, 2023

(65) Prior Publication Data
US 2025/0209270 A1    Jun. 26, 2025

(51) Int. Cl.
*G06F 40/284* (2020.01)
*G06F 16/22* (2019.01)
*G06F 18/2323* (2023.01)

(52) U.S. Cl.
CPC ........ *G06F 40/284* (2020.01); *G06F 16/2228* (2019.01)

(58) Field of Classification Search
CPC ............. G06F 16/9024; G06F 16/9027; G06F 18/2323; G06F 40/279; G06F 40/284;
(Continued)

(56) References Cited

U.S. PATENT DOCUMENTS

| | | | |
|---|---|---|---|
| 6,516,305 B1 * | 2/2003 | Fraser | G06F 8/4434 706/12 |
| 11,726,750 B1 * | 8/2023 | Arcadinho | G06F 40/284 717/113 |

(Continued)

FOREIGN PATENT DOCUMENTS

| | | |
|---|---|---|
| CN | 112381280 B | 1/2023 |
| EP | 2128798 | 12/2009 |

OTHER PUBLICATIONS

Zugner, Daniel, et al., "Language-Agnostic Representation Learning of Source Code from Structure and Context", ICLR 2021, https://arxiv.org/abs/2103.11318, Mar. 21, 2021, 22pgs.

(Continued)

*Primary Examiner* — Martin Lerner
(74) *Attorney, Agent, or Firm* — Hickman Becker Bingham Ledesma LLP

(57) ABSTRACT

During pretraining, a computer generates three trainable and untrained machine learning models that are a token sequence encoder, a token predictor, and a path predictor. A sequence of lexical tokens is generated that represents a lexical text in a training corpus. A graph is generated that represents the lexical text. In the graph, a next traversal path is selected that corresponds to a next lexical token that is adjacent to a sliding subsequence of the sequence of lexical tokens. From the subsequence, the token sequence encoder infers an encoded sequence that represents the subsequence. The path predictor and token predictor accept the encoded sequence as input for respective inferencing for which respective training losses are measured. Both training losses are combined into a combined loss that is used to increase the accuracy of the three machine learning models by, for example, backpropagation of the combined loss.

20 Claims, 4 Drawing Sheets

(58) Field of Classification Search
CPC ...... G06F 40/30; G06N 3/045; G06N 3/0475; G06N 3/08
USPC .......................................... 704/1, 9; 706/12
See application file for complete search history.

(56) References Cited

U.S. PATENT DOCUMENTS

| | | | |
|---|---|---|---|
| 12,086,268 B2* | 9/2024 | Clement | G06N 3/047 |
| 2019/0370389 A1* | 12/2019 | Blouw | G06F 40/30 |
| 2022/0004720 A1* | 1/2022 | Wu | G06F 16/9024 |
| 2022/0075945 A1* | 3/2022 | Zhang | G06F 40/284 |
| 2022/0198294 A1 | 6/2022 | Schneuwly et al. | |
| 2023/0385315 A1* | 11/2023 | Jiao | G06F 16/9532 |
| 2024/0096125 A1* | 3/2024 | Yebes Torres | G06F 40/284 |
| 2024/0126513 A1* | 4/2024 | Zhao | G06N 5/04 |
| 2024/0160955 A1* | 5/2024 | Zhao | G06N 20/00 |
| 2024/0331425 A1* | 10/2024 | Qi | G06N 3/045 |
| 2024/0354317 A1* | 10/2024 | Fayyaz | G06F 16/313 |
| 2025/0165852 A1* | 5/2025 | Feith | G06N 3/045 |

OTHER PUBLICATIONS

Zhang, Jian, et al., "A Novel Neural Source Code Representation Based on Abstract Syntax Tree", 2019 IEEE/ACM 41st ICSE, doi: 10.1109/ICSE.2019.00086, pp. 783-794, May 25, 2019, 12pgs.

Yamaguchi et al., "Generalized Vulnerability Extrapolation using Abstract Syntax Trees", ACSAC '12 Dec. 3-7, 2012, Orlando, Florida USA, 10 pages.

Mou et al., "Building Program Vector Representations for Deep Learning", dated Sep. 11, 2014, 11 pages.

Jimenez et al., "On the Impact of Tokenizer and Parameters on N-Gram Based Code Analysis", dated 2018, 12 pages.

Guo, Daya, et al., "UniXcoder: Unified Cross-Modal Pre-training for Code Representation", https://arxiv.org/abs/2203.03850, Mar. 8, 2022, 14pgs.

Devlin, Jacob, et al., "BERT: Pre-training of Deep Bidirectional Transformers for Language Understanding", https://arxiv.org/abs/1810.04805, May 24, 2019, 16pgs.

Cai et al., "An Abstract Syntax Tree Encoding Method for Cross-Project Defect Prediction", IEEE, dated Nov. 15, 2019, 10 pages.

Bockermann et al., "Learning SQL for Database Intrusion Detection Using Context-Sensitive Modelling", DIMVA dated 2009, LNCS 5587, 10 pages.

Apel et al., "Learning SQL for Database Intrusion Detection using Context-sensitive Modelling", dated 2009, 33 pages.

Alon et al., "A General Path-Based Representation for Predicting Program Properties" dated Apr. 22, 2018, 16 pages.

"Tree-sitter", Introduction, https://tree-sitter.github.io/tree-sitter/, last accessed Jun. 9, 2023, 4pgs.

Liu, Yapeng et al., "Improving code completion by sequence features and structural features", Proceedings of the 4th World Symposium on Software Engineering, WSSE '22, 2022, pp. 51-58.

Ben Allal, Loubna et al., "Santacoder: don't reach for the stars!", CoRR, abs/2301.03988, 2023, available: https://doi.org/10.48550/arXiv.2301.03988, 22 Pages.

Brown et al. "Language models are few-shot learner", Advances in Neural Information Processing Systems 33: Annual Conference on Neural Information Processing Systems 2020, NeurIPS 2020, 75 Pages.

Caruana, Rich, "Multitask Learning", Machine Learning, Jul. 28, 1997, 35 Pages.

Chen, Mark et al., "Evaluating large language models trained on code", CoRR, abs/2107.03374, 2021, available: https://arxiv.org/abs/2107.03374, 35 Pages.

Chowdhery, Aakanksha et al., "Palm: Scaling language modeling with pathways", CoRR, abs/2204.02311, 2022, available: https://doi.org/10.48550/arXiv.2204.02311, 87 Pages.

Devlin, Jacob et al., "BERT: Pre-training of Deep Bidirectional Transformers for Language Understanding", Proceedings of the 2019 Conference of the North American Chapter of the Association for Computational Linguistics, Jun. 2-7, 2019, 4171-4186.

Guo, Daya et al., "Graphcodebert: Pre-training code representations with data flow", 9th International Conference on Learning Representations, ICLR 2021, Austria, May 3-7, 2021, available: https://openreview.net/forum?id=jLoC4ez43PZ, 15 Pages.

Guo, Daya et al., "Unixcoder: Unified cross-modal pre-training for code representation", Proceedings of the 60th Annual Meeting of the Association for Computational Linguistic, ACL 2022, May 22-27, 2022, pp. 7212-7225.

Izadi, Maliheh et al., "Codefill: Multi-token code completion by jointly learning from structure and naming sequences", Proceedings of the 44th International Conference on Software Engineering, ICSE '22, New York, NY, USA, 2022, pp. 401-412.

Jiang, Xue et al., "A tree-based pre-trained model for programming language", Proceedings of the Thirty-Seventh Conference on Uncertainty in Artificial Intelligence, Jul. 27-30, 2021, vol. 161 of Proceedings of Machine Learning Research, pp. 54-63.

Kanade, Aditya et al., "Learning and Evaluating Contextual Embedding of Source Code", Proceedings of the 37th International Conference on Machine Learning, Jul. 13-18, 2020, vol. 119 of Proceedings of Machine Learning Research, pp. 5110-5121.

Alon, Uri et al., "code2seq: Generating sequences from structured representations of code", 7th International Conference on Learning Representations, ICLR 2019, New Orleans, LA, USA, May 6-9, 2019, OpenReview.net, 2019, 22 Pages.

Kocetkov, Denis et al., "The stack: 3 TB of permissively licensed source code", Preprint, 2022, 27 Pages.

Zügner, Daniel et al., "Language-Agnostic Representation Learning of Source Code from Structure and Context", 9th International Conference on Learning Representations, ICLR 2021, May 3-7, 2021, available: https://openreview.net/forum?id=Xh5eMZVONGF.

OpenAI, "GPT-4 technical report", CoRR, abs/2303.08774, 2023, available: https://doi.org/10.48550/arXiv.2303.08774, 100 Pages.

Peng, Han et al., "Integrating Tree Path in Transformer for Code Representation", Advances in Neural Information Processing Systems, vol. 34, 2021, pp. 9343-9354.

Radford, Alec et al., "Improving language understanding by generative pre-training", 2018, 12 Pages.

Radford, Alec et al., "Language models are unsupervised multitask learners", Openai Blog, 1(8):9, 2019, 12 Pages.

Tang, Ze, et al., "Ast-trans: Code summarization with efficient tree-structured attention", 2022 IEEE/ACM 44th International Conference on Software Engineering (ICSE), 2022, pp. 150-162.

Touvron, Hugo et al., "Llama: Open and efficient foundation language models", CoRR, abs/2302.13971, 2023, available: https://doi.org/10.48550/arXiv.2302.13971, 17 Pages.

Vaswani, Ashish et al., "Attention is all you need", Advances in Neural Information Processing Systems 30: Annual Conference on Neural Information Processing Systems 2017, Dec. 4-9, 2017, Long Beach, CA, USA, pp. 5998-6008.

Wang, Xiao et al., "Heloc: hierarchical contrastive learning of source code representation", Proceedings of the 30th IEEE/ACM International Conference on Program Comprehension, ICPC 2022, Virtual Event, May 16-17, 2022, pp. 354-365.

Wang, Xin et al., "SynCoBERT: Syntax-Guided Multi-Modal Contrastive Pre-Training for Code Representation", 2021, 9 Pages.

Wang, Yanlin et al., "Code completion by modeling flattened abstract syntax trees as graphs", Thirty-Fifth AAAI Conference on Artificial Intelligence, AAAI 2021, Feb. 2-9, 2021, pp. 14015-14023.

Zhu, Yukun et al., "Aligning books and movies: Towards story-like visual explanations by watching movies and reading books", The IEEE International Conference on Computer Vision (ICCV), Dec. 2015, 23 Pages.

Kim, Seohyun et al., "Code prediction by feeding trees to transformers", 43rd IEEE/ACM International Conference on Software Engineering, ICSE 2021, Madrid, Spain, May 22-30, 2021, pp. 150-162, available: https://doi.org/10.1109/ICSE43902.2021.00026.

Bishop et al., "Exact Calculation of the Hessian Matrix for the Multi-layer Perceptron", Neural Computation 4 No. 4 (1992) 494-501, 8 pages.

(56) References Cited

OTHER PUBLICATIONS

An et al., "Variational Autoencoder based Anomaly Detection using Reconstruction Probability", Feb. 2015 Special Lecture on IE, SNU Data Mining Center, Dec. 27, 2015, 18 pages.

* cited by examiner

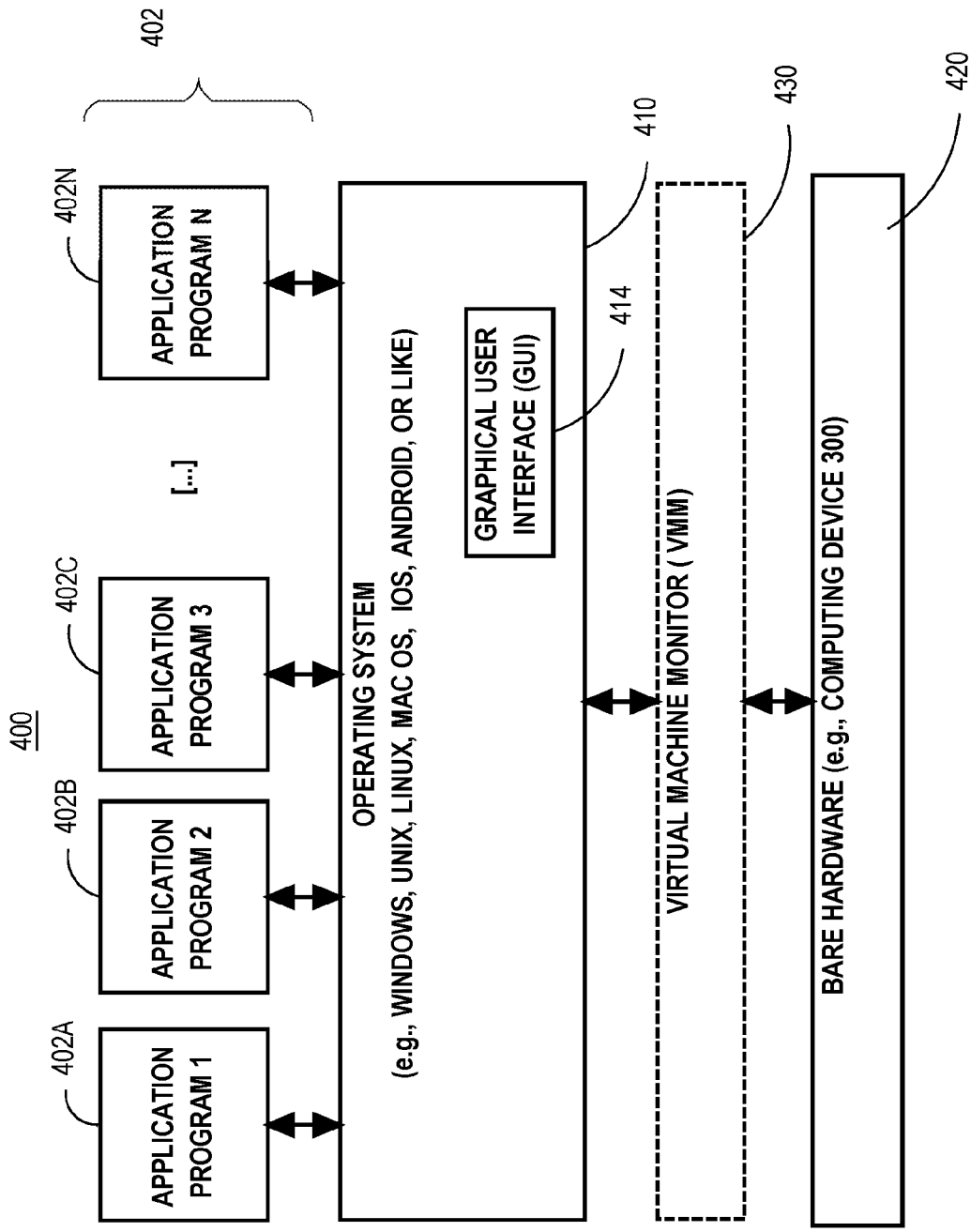

NEXT AST BRANCH PREDICTION AND NEXT TOKEN PREDICTION JOINT PRE-TRAINING TASK FOR CODE GENERATIVE MODELS

FIELD OF THE INVENTION

The present invention relates to natural language processing (NLP). Herein is machine learning pretraining to predict a graph traversal path that corresponds to a next lexical token in a sequence of lexical tokens that represents a lexical text.

BACKGROUND

For state of the art source code generation, training is bilingual and biphasic as follows. A large language model is pretrained with a natural language training corpus and then finetuned with a corpus of a particular programing language, and the programing language is treated no differently than natural language. A programming language has rules and internal grammar much stricter than a natural language, and naively applying a natural language model to a programming language task neglects the inherent structure present in code, potentially leading to suboptimal generated code.

Accuracy of bilingual training is suboptimal because source code syntax is unused. Decreased accuracy of bilingual training may also increase a finetuning duration needed to achieve a desired final accuracy. Thus, bilingual biphasic training may be both slow and inaccurate.

Alternative approaches that inspect program structure cannot handle syntactically invalid source code, even though an application such as source code completion usually begins with invalid logic. For example, an approach may tokenize source code into an original token sequence and insert synthetic tokens that represent syntactic structure into the original token sequence to generate an enhanced token sequence. However, synthetic tokens are unavailable for insertion if source logic is syntactically invalid and, for example in production, missing synthetic tokens may somewhat or entirely interfere with inferencing.

BRIEF DESCRIPTION OF THE DRAWINGS

In the drawings:

FIG. 4 is a block diagram that illustrates a basic software system that may be employed for controlling the operation of a computing system.

DETAILED DESCRIPTION

Figure 1:
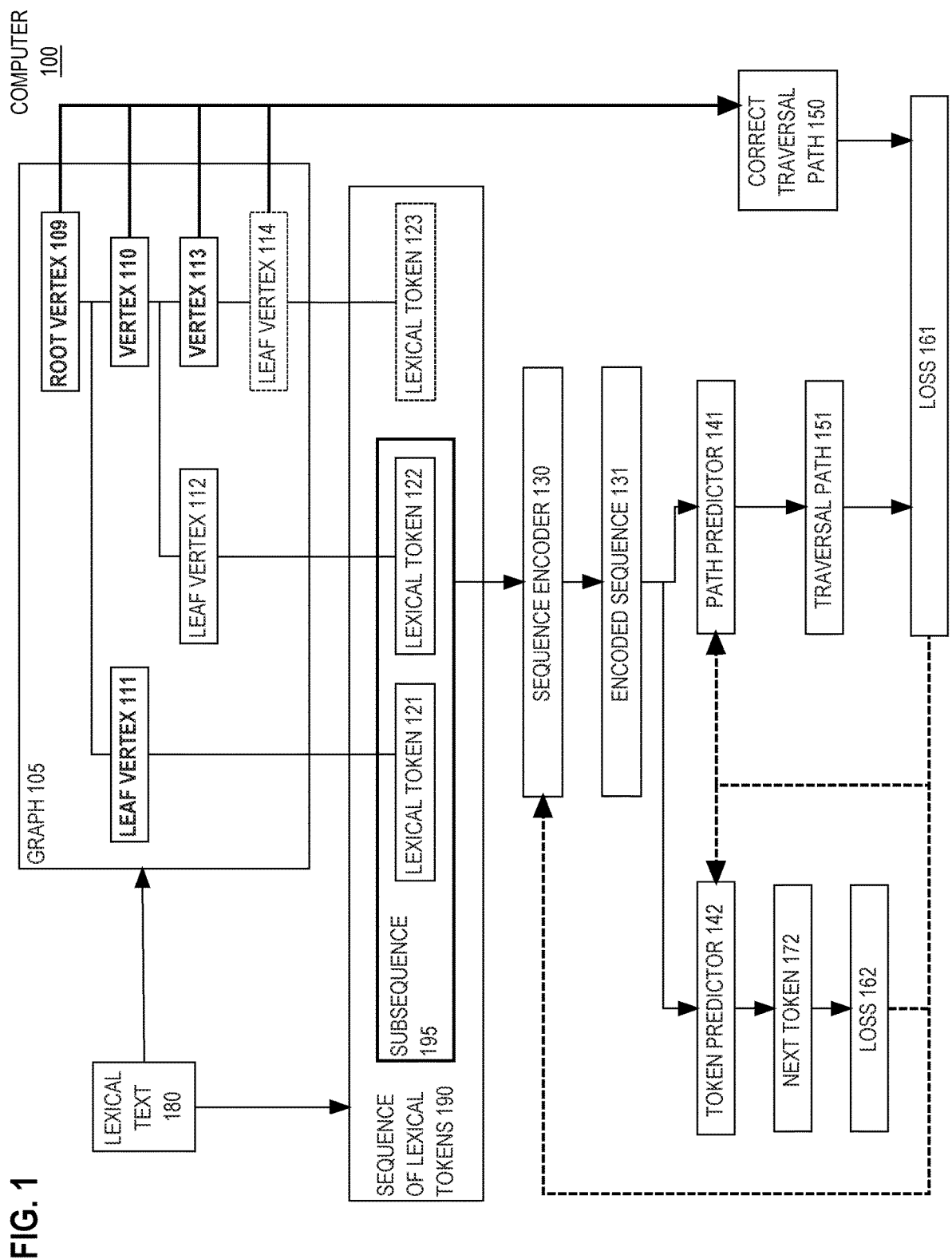
FIG. 1 is a block diagram that depicts an example computer that pretrains a path predictor to predict, based on natural language processing (NLP), a traversal path that corresponds to a next lexical token from a preceding adjacent subsequence in a sequence of lexical tokens that represent a lexical text.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is a natural language processing (NLP) approach for machine learning pretraining to predict a graph traversal path that corresponds to a next lexical token in a sequence of lexical tokens that represents a lexical text. This approach provides a robust and efficient framework to inject syntactic and semantic information of a programing language into a learning-based model that may, for example, be source code generative. Every source code snippet has an equivalent graph representation such as a parse tree, which expresses the language's formal grammar and the (e.g. semantic) relationships between variables. Examples of such structures are an abstract syntax tree (AST) and a data flow graph (DFG).

This is a pretraining framework referred to herein as next branch prediction (NBP), which injects the code structure into the generative model during training, thereby removing the need to use additional graph information as input during (e.g. production) inferencing. To provide token-level knowledge to a language encoder model, a multitask learning paradigm includes an NBP task, which is novel, and a next token prediction (NTP) task. A language encoder model that was trained herein will continue to infer encodings that have high syntactic and semantic accuracy even after the NBP task is discarded (i.e. not deployed into production).

NBP is a structure-aware pretraining task for (e.g. generative) language models. This task takes a textual input and a global graph that captures the structural and syntactic information of the textual input. The input is tokenized and, from the global graph, one graph traversal path per token is extracted. The textual input as well as graph traversal paths have a vector representation capturing their semantic and structural information. For the input, this representation is computed by the generative model, which produces a contextual vector representation for each token, taking into account the other tokens present in a sliding context window.

For a next traversal path extracted from a graph, the vector representation is produced using sub-paths extracted from the traversal path. The goal of NBP is to align the vector representation of each token with the vector representation of its associated graph traversal path. This way, the language encoder model is injected with structural information exclusively during training. Pretraining herein may be composed of the following three phases.

In the first phase, the source code is tokenized into a sequence of tokens. Then, each token is associated to a traversal path extracted from the graph built from the textual input. Each traversal path is extracted to only contain information relating to a next token that is immediately adjacent to a defined context window. At the end of the first phase, there are a sequence of tokens and a sequence of traversal paths to be used to train the model.

In the second phase, each graph traversal path is converted into a vector representation capturing its structure. Each traversal path is considered to be a collection of partially overlapping n-grams, where each n-gram corresponds to a sub-path of length $n>1$ extracted from a traversal path. The extracted sub-paths are one-hot encoded using a predefined dictionary of N unique sub-paths or sub-path patterns as discussed herein. This dictionary maps each sub-path to the encoding space $\mathbb{R}^N$. Finally, the traversal path's vector representation $s \in \mathbb{R}^N$ is defined as the normalized sum of the one-hot encodings of all sub-paths extracted. In this way, each traversal path's vector representation effectively is a probability distribution.

In the third phase, the token sequence is processed by the model, for example in an autoregressive manner. At step i, the model considers the first i tokens in the sequence to produce a contextual vector representation of token i, incrementally proceeding in this way until there is a vector representation for every token. Then, for example using a final linear layer, each token's vector is mapped to the traversal path's vector space and, for example by softmax, combined to produce an inferred probability distribution. The goal of NBP is to align the probability distribution inferred by a path predictor model for each token with the probability distribution associated to the token's graph traversal path. This is achieved using, for example, a multi-label cross-entropy loss function. In this way, the language encoder model learns to produce vector representations for each token implicitly aligning with the structure behind that token, injecting the semantic and syntactic knowledge during training. Since these vector representations are then used to predict the next token, a predictive model will implicitly use the structural knowledge acquired during training to make the prediction.

The goal of the code generative model is to predict the next token given a sequence of tokens which, herein, is based on the above NTP task. The global training routine is performed with a multitask learning framework that simultaneously trains the language encoder model with NTP and NBP tasks. The final model may, for example, retain the NTP task within the generative model to predict a next token as, for example, a generative proposal.

This approach has at least the following novel aspects.

Next AST Branch Prediction for Generative Models: To compute each root-to-leaf path's vector representation, sub-paths of length n>1 (n-grams) are extracted. Each node (i.e. vertex) in the root-to-leaf path represents contextual information in the source code. Since the AST is generated following a list of rules and a specific grammar, subsequent nodes in a root-to-leaf path are contextually related. Each sub-path is one-hot encoded and the final root-to-leaf path representation is the normalized sum of all sub-path encodings. This path encoding is stateless and does not depend on previous paths, which forces the model to predict the future structure, the next branch in the AST. Stateless processing of a current traversal path consumes less time and memory than, for example, processing a subgraph that contains multiple traversal paths. Stateless processing of a current traversal path instead of a multipath subgraph increases pretraining accuracy because a traversal path is less noisy than a multipath subgraph.

Pretraining with Joint NBP and NTP Tasks: NTP is responsible for injecting the language encoder model with token-level knowledge, and novel NBP is responsible for providing structure-level knowledge.

This approach has at least the following advantages. Compared to large-scale language models that do not use structure, models pretrained herein are smaller, faster to train, and faster at inference. Compared to alternative models that explicitly use code structure, for example as discussed in the above Background, models pretrained herein are faster at production inferencing because they do not need to compute and process the code structure, and instead process only the tokens. Implicitly learning the input's structure makes the model more general (i.e. decreases overfitting) and increases the model's ability to generate valid code.

The above language encoder model is referred to herein as a token sequence encoder, and the NTP and NBP tasks have separate machine learning models referred to herein respectively as a token predictor and a path (i.e. branch) predictor. In a pretraining embodiment, a computer generates three trainable and untrained machine learning models that are the token sequence encoder, the token predictor, and the path predictor. A sequence of lexical tokens is generated that represents a lexical text in a training corpus. A graph is generated that represents the lexical text. In the graph, a next traversal path is selected that corresponds to a next lexical token that is adjacent to a sliding subsequence of the sequence of lexical tokens. From the subsequence, the token sequence encoder infers an encoded sequence that represents the subsequence of the sequence of lexical tokens. The path predictor and token predictor accept the encoded sequence as input for respective inferencing for which respective training losses are measured. Both training losses are combined into a combined loss that is used to increase the accuracy of the three machine learning models by, for example, backpropagation of the combined loss.

1.0 Example Computer

FIG. 1 is a block diagram that depicts an example computer 100. Computer 100 pretrains path predictor 141 to predict, based on natural language processing (NLP), traversal path 151 that corresponds to next lexical token 123 from preceding adjacent subsequence 195 in sequence of lexical tokens 190 that represent lexical text 180. Computer 100 may be one or more of a rack server such as a blade, a personal computer, a mainframe, or a virtual computer.

All components shown in FIG. 1 may be loaded (or generated) into random access memory (RAM) of computer 100, including lexical text 180 that is a character string that, during pretraining, is syntactically correct and accepted as valid input by a parser operated by computer 100 or previously by another computer. Parsing is discussed later herein, and a parser may generate graph 105 as a parse graph. Regardless of whether computer 100 has a parser or instead expects preexisting graphs, computer 100 may contain and operate a tokenizer, such as a lexer or scanner, that generates sequence of lexical tokens 190 from lexical text 180. In an embodiment, sequence encoder 130 contains its own tokenizer that can generate sequence of lexical tokens 190 from lexical text 180. Tokenization is discussed later herein. Herein, sequence encoder 130 may also be referred to as a token sequence encoder.

1.1 Example Languages

In an embodiment, lexical text 180 is one logic statement of a formal language. In an embodiment, the formal language is a declarative language such as domain specific language (DSL) such as structured query language (SQL), JavaScript object notation (JSON), or extensible markup language (XML). In an embodiment, the formal language is an imperative language such as a scripting language such as JavaScript or python or a general purpose programming language such as Java or C/C++.

In an embodiment, lexical text 180 is a lexical block that contains a sequence of logic statements, such as a for loop or a subroutine. In an embodiment, lexical text 180 is a logic script or a source file that, for example, contains a compilation unit.

In an embodiment, pretraining of machine learning models 130 and 142 uses a training corpus that consists only of lexical texts, including lexical text 180. The training corpus may contain more lexical texts than can be simultaneously retained in RAM of computer 100. For example, the training corpus may reside on disk, in a database, or remotely. Pretraining is discussed later herein.

1.2 Graph and Graph Elements

Computer 100 may store or access graph 105 that may be a directed acyclic graph (DAG), dataflow graph, a control flow graph, a property graph, or a (e.g. imbalanced) logical tree such as: a) an abstract syntax tree (AST) that a parser may generate to represent one logic statement or a block (i.e. sequence) of logic statements or b) a document object model (DOM) such as of JSON or XML. For example, parsing lexical text 180 by a parser may generate graph 105 as a parse tree or AST that represents lexical text 180.

Graph 105 contains many vertices 109-114 interconnected by many edges. For example as shown, vertex 110 has edges that respectively connect vertices 109, and 112-113. In the shown embodiment, graph 105 is undirected and its edges are undirected. In an embodiment not shown, graph 105 and its edges are directed.

In an embodiment, graph 105 is a directed acyclic graph (DAG) or, as shown, an undirected logical tree that has exactly one root vertex 109, many leaf vertices 111-112 and 114, and a sequence of tree levels that each contain many intermediate vertices 110 and 113.

In an embodiment, the vertices and edges in graph 105 are stored as rows in tables such as vertex table(s) and edge table(s). In an embodiment, the vertices and edges in graph 105 are non-contiguously stored in a dynamically fragmented heap.

1.3 Graph Traversal Path

Herein, a graph traversal path is a sequence of vertices that are reached by traversing edges in a graph. For example, leaf vertex 112 can be reached by traversing from root vertex 109 to intermediate vertex 110 to leaf vertex 112. A traversal path begins at a start vertex and stops at an end vertex.

Herein, all traversal paths start at the root vertex and end at a leaf vertex. Herein, a node is a vertex or, as discussed below, a vertex type. Herein, a traversal path or sub-path (i.e. partial traversal path) is a sequence of multiple nodes. For example, traversal path 109→110→112 begins at root vertex 109 and ends at leaf vertex 112.

Herein, a traversal path is composed of one or more partially overlapping n-grams, where an n-gram is a sub-path that contains a sequence of exactly n vertices (or n vertex types), and n is a predefined integer constant greater than one. For example if n is two, then traversal path 109→110→112 contains two bigrams (i.e. 2-grams) that are 109→110 and 110→112.

An n-gram may or may not contain the root vertex and may or may not contain a leaf vertex. For example, bigram 109→111 contains the root vertex and a leaf vertex. Whereas, bigram 110→113 contains neither the root vertex nor a leaf vertex.

Computer 100 has a path vocabulary (not shown) that is a predefined set of some distinct n-grams that might occur in a graph, and these n-grams are referred to herein as non-excluded n-grams. N-grams that do not occur in the path vocabulary are excluded (i.e. ignored) even if they occur in graph 105. For example, a traversal path may contain only n-grams that are excluded, only n-grams that are not excluded, or a mix of excluded and non-excluded n-grams. The path vocabulary is referred to in the above Overview as a dictionary.

In an embodiment, a traversal pattern may specify vertices by vertex type or by vertex property value, and the path vocabulary contains distinct traversal patterns instead of traversal sub-paths. For example, vertices 112 and 114 may be red (R) vertices, and vertices 109-111 and 113 may be green (G) vertices that are shown with bold text. In that case, a traversal pattern of G→R matches 110→112 and 113→114. For example although not shown, two lexical tokens may correspond to a same leaf-to-root traversal pattern G→G→R, regardless of whether or not both lexical tokens are repeated occurrences of a same lexical token.

There is a one-to-one correspondence between each of lexical tokens 121-123 and each of leaf vertices 111-112 and 114 respectively. Due to non-leaf vertices, graph 105 has more vertices than sequence of lexical tokens 190 has tokens, unless an embodiment has, for example, subword tokens. An individual non-leaf vertex usually does not have a one-to-one correspondence to an individual lexical token. For example, multiple lexical tokens 122-123 share multiple non-leaf vertices 109-110, and root vertex 109 by itself corresponds to all lexical tokens 121-123.

In this example, each of lexical tokens 121-123 corresponds to a respective root-to-leaf traversal path, which means that graph 105 has as many (e.g. non-distinct) traversal paths as sequence of lexical tokens 190 has tokens. Root-to-leaf traversal paths in graph 105 may have same or different lengths. For example, traversal path 109→111 has two vertices and traversal path 109→110→112 has three vertices. For example, graph 105 may be a logical tree that is or is not balanced.

1.4 Predefined Vocabulary of Traversal Patterns

Herein, a vocabulary (i.e. non-excluded) n-gram is any n-gram in the predefined path vocabulary. For example, blue (B) vertices may be a third vertex type or vertex property value, and the path vocabulary may consist only of bigram traversal patterns G→G, G→R, R→G, and B→B, even though bigram R→G does not occur in graph 105, and even though vertex type B does not occur in graph 105.

1.5 Sliding Window Selects Subsequence

The approach herein is predictive and, given subsequence 195 as input, token predictor 142 can infer that next token 172 will be lexical token 123 that is shown with a dashed outline to indicate that subsequence 195 does not contain lexical token 123. During pretraining, subsequence 195 may be a fixed size (i.e. token count) sliding window that may incrementally advance through sequence of lexical tokens 190. For example, if subsequence 195 advances (i.e. slides rightwards) by an increment of one lexical token, then lexical token 121 becomes excluded from subsequence 195, and lexical token 123 becomes included in subsequence 195. When subsequence 195 is initially positioned or subsequently repositioned by sliding, then as discussed later herein: a) machine learning models 130 and 141-142 generate respective inferences 131, 151, and 172; and b) data 150 and 161-162 are regenerated.

1.6 Correct Traversal Path is Self-Supervised Training Label

Correct traversal path 150 is a perfectly accurate frequency distribution of, for example, vocabulary bigrams that occur in the traversal path that corresponds to next lexical token 123. In an embodiment, n-gram frequency may be: a) a Boolean that indicates presence regardless of how many additional occurrences of a same n-gram or b) an integer count or a unit normalized frequency of occurrences of a same n-gram. For example when subsequence 195 slides to include lexical token 123 then, in that case, computer 100 may detect that bigram G→G occurs twice in the traversal path that corresponds to lexical token 123, which is a frequency that correct traversal path 150 may record.

Herein, each vocabulary n-gram is a Boolean or numeric frequency label, and correct traversal path 150 is a multilabel frequency distribution that can be used as a self-supervision label as discussed later herein. Correct traversal path 150 may record a respective value for each distinct vocabulary n-gram, and the value may be zero or false if the vocabulary n-gram does not occur in the next traversal path. For example, correct traversal path 150 may effectively provide an indication that one vocabulary n-gram is more frequent in the next traversal path than is another vocabulary n-gram. These aspects of vocabulary n-grams are present regardless of whether n-grams are based on vertices or vertex types as discussed earlier herein.

In some discussions herein, "next" may be an adjective that indicates an artifact (i.e. a lexical token, its leaf vertex, or its root-to-leaf traversal path) is immediately adjacent to the artifacts that are in or correspond to subsequence 195. When subsequence 195 slides, those next artifacts (i.e. a lexical token, its leaf vertex, and its root-to-leaf traversal path) transition from excluded to included with respect to subsequence 195.

Herein, subsequence 195 may be referred to as the current context. Herein, the current context includes only subsequence 195 but not the vertices nor traversal paths that correspond to subsequence 195. That is, computer 100 disregards what subgraph of graph 105 corresponds to subsequence 195.

During pretraining, correct traversal path 150 may be used for self-supervision of machine learning models 130 and 141 as follows. Self-supervised pretraining of token predictor 142 is discussed later herein and does not entail correct traversal path 150.

Sequence encoder 130 accepts subsequence 195 as input, which causes sequence encoder 130 to infer (i.e. generate) encoded sequence 131 that is a fixed size (i.e. count of bytes or elements of a numeric array) dense semantic representation of subsequence 195. Inference mechanisms of sequence encoder 130 may, for example, be based on bidirectional encoder representations from transformers (BERT). Although encoded sequence 131 represents subsequence 195, an embodiment may additionally or instead use encoded sequence 131 as a contextual encoding that represents the latest lexical token that slid into subsequence 195. In that case, encoded sequence 131 is a contextual encoding of lexical token 122 as discussed in the above Overview.

1.7 Path Predictor Infers Frequency Distribution

Path predictor 141 accepts encoded sequence 131 as input, which causes path predictor 141 to infer (i.e. generate) inferred traversal path 151 that is a frequency distribution having a same format and meaning as correct traversal path 150 as discussed above. Inferred traversal path 151 is a more or less inaccurate approximation of correct traversal path 150. If path predictor 141 is perfectly accurate, then traversal paths 150-151 are identical, in which case numeric loss 161 is zero. However, accuracy of inferred traversal path 151 is positively correlated with sequence encoder 130's learned ability to record syntax and semantics of subsequence 195 in a way that can represent a next traversal path.

In an embodiment, loss 161 is a number that is the result of comparing two frequency distributions that are traversal paths 150-151. For example, loss 161 may be measured as multi-label cross-entropy, where each distinct vocabulary n-gram is treated as a label.

1.8 Next Token Prediction and Error Propagation

By backpropagation for example, as discussed later herein, loss 161 may be used to adjust the internals (e.g. weights or coefficients) of machine learning models 130 and 141-142. However, as shown by the bold dashed lines, losses 161-162 are arithmetically combined to generate a combined loss that is a number that is used, by backpropagation for example, to adjust machine learning models 130 and 141-142. Loss 162 is measured as follows.

Token predictor 142 accepts encoded sequence 131 as input, which causes token predictor 142 to predict next token 172. If next token 172 correctly is lexical token 123, then numeric loss 162 is zero. Otherwise, loss 162 is a number that measures a difference between tokens 123 and 172.

Losses 161-162 may be combined by addition or averaging, which may or may not entail weighting (i.e. scaling by multiplication) either or both of losses 161-162. For example, some or all of machine learning models 130 and 141-142 may be artificial neural networks into which the combined loss can, by neural backpropagation, be used to adjust connection weights between neurons.

1.9 Deployment into Example Software Applications

Deployment into production is discussed later herein, which entails deployment of sequence encoder 130 without path predictor 141 and with or without token predictor 142. Deployment may be into a production application that is or is not generative. If the application is generative, both of machine learning models 130 and 142 should be deployed. For example, code completion is a generative application in a text editor such as an integrated development environment (IDE), in which next token 172 may be a token that data structures 180 and 190 do not contain but, for example for syntactic and/or semantic validity, should contain. Likewise, code completion can use next token 172 to replace a (e.g. syntactically or semantically) invalid lexical token 123. For example, tokens 123 and 172 may differ, even in production which, in one embodiment, may cause code completion by replacement of an invalid token or, in another embodiment that might not involve text editing, may be detected as an anomaly. That is, machine learning models 130 and 142 can be used together in an application, which is not generative, to detect an anomaly in lexical text 180.

2.0 Example Pretraining Process

Figure 2:
FIG. 2 is a flow diagram that depicts an example computer process that pretrains a path predictor to predict a traversal path that corresponds to a next lexical token from a preceding adjacent subsequence in a sequence of lexical tokens that represent a lexical text.

FIG. 2 is a flow diagram that depicts an example process that computer 100 may perform to pretrain path predictor 141 to predict, based on natural language processing (NLP), traversal path 151 that corresponds to next lexical token 123 from preceding adjacent subsequence 195 in sequence of lexical tokens 190 that represent lexical text 180.

Step 201 is preparatory and performed only once, even if other steps are repeated. Step 201 generates (i.e. instantiates) three machine learning models 130 and 141-142 that are untrained and trainable. In an embodiment, machine learning models 130 and 141-142 are sub-models within a combined machine learning model, as discussed elsewhere herein. Step 201 may configure hyperparameters of machine learning models 130 and 141-142.

Steps 202-211 are repeated for each lexical text in a training corpus. As discussed below, some of these steps have more repetitions than some others of these steps. Steps 202-203 occur exactly once for each lexical text in the training corpus and, in this example, lexical text 180 is the current lexical text of steps 202-211.

Step 202 generates a lexical token sequence (i.e. sequence of lexical tokens 190) that represents lexical text 180 as discussed earlier herein.

Step 203 generates, receives, or loads graph 105 that represents lexical text 180 as discussed earlier herein. All lexical texts in the training corpus are syntactically valid. In an embodiment, all lexical texts in the training corpus also are semantically valid. The process of FIG. 2 performs self-supervised pretraining that requires at least syntactic validity. However after training, in a production environment, components 105, 141, 150-151, and 161-162 are absent. Thus in production, syntactic and semantic validity of a lexical text are optional. For example in production, machine learning models 130 and 142 will accept and accurately inference based on a new lexical text that lacks syntactic and/or semantic validity.

As discussed earlier herein, subsequence 195 is a sliding window that advances by incrementally sliding (e.g. by one token) over sequence of lexical tokens 190. Steps 204-211 are repeated each time subsequence 195 incrementally slides. For example, steps 204-211 may be steps within a control flow loop that provides iteration. Each iteration repeats steps 204-211.

Behavior of step 204 depends on which iteration. In the first iteration, step 204 positions subsequence 195 at the beginning of sequence of lexical tokens 190 to contain, for example, lexical tokens 121-122. In any other iteration, step 204 instead slides subsequence 195 by one token as discussed earlier herein. In any case, step 204 selects which tokens are included in subsequence 195 and, unless sequence of lexical tokens 190 contains a span of identical tokens that is longer than subsequence 195, the mix of tokens in subsequence 195 incrementally changes in each iteration. Thus, contents of subsequence 195 can be different in each iteration.

From graph 105, step 205 generates correct traversal path 150 by selecting and extracting the next traversal path that corresponds to the next lexical token that is immediately adjacent to subsequence 195 but not yet contained in subsequence 195. Herein, the traversal path that represents a lexical token is the root-to-leaf traversal path that contains the leaf vertex that corresponds to that lexical token. Herein, a root-to-leaf traversal path contains exactly one leaf vertex, and a leaf vertex is contained in exactly one root-to-leaf traversal path.

In an embodiment discussed earlier herein, step 205 detects and extracts vocabulary n-grams (i.e. sub-paths) that occur in the next traversal path. For example, the next token may be lexical token 123 that corresponds to next leaf vertex 114 that is in next traversal path 109→110→113→114 that is indicated by the bold arrow that flows into correct traversal path 150 as shown in FIG. 1. Step 205 generates correct traversal path 150 as a self-supervision label that will be used to self-supervised train machine learning models 130 and 141-142 as discussed later herein.

As discussed earlier herein, the predefined vocabulary of, for example, bigrams may contain sequences of vertex types. For example, vertices 112 and 114 may be red (R), and vertices 109-111 and 113 are shown bold in FIG. 1 to indicate that they are green (G). In that case step 205 may, for example, count that next traversal path 109→110→113→114 contains one occurrence of bigram G→R and two occurrences of bigram G→G. Step 205 ignores (i.e. does not count) n-grams that are excluded from the predefined vocabulary.

Correct traversal path 150 counts n-gram occurrences and records them as frequencies of distinct n-grams that occur in the next traversal path. Because subsequence 195 may be different in each iteration, so too the current leaf vertex, the current traversal path, and correct traversal path 150 may be different in each iteration.

From subsequence 195, sequence encoder 130 infers encoded sequence 131 in step 206 as discussed earlier herein. Steps 206 and 211 do not entail operating a multi-branch neural network. A multibranch neural network has multiple (e.g. two) neural branches that may, for example, concurrently operate. The neural branches are independent from each other because there is no neural connectivity from one neural branch to another. A neural branch is part of a machine learning model, which is not the same as a next branch that is training data as discussed in the Overview. A next branch is a next traversal path as discussed earlier herein.

In an embodiment, machine learning models 141-142 are neural subnetworks that are combined as separate neural branches in a larger neural network. In that case, components 141 and 151 cooperate in a first neural branch to generate loss 161 and, for example concurrently, components 142 and 172 cooperate in a second neural branch to generate loss 162. In that case, steps 207 and 209 occur in the first neural branch, and steps 208 and 210 occur in the second neural branch. Whether neural or not, pretraining herein is multitask, where machine learning models 141-142 each performs a distinct respective self-supervised training task, and steps 207 and 209 of a first training task may, for example for acceleration, be concurrent to steps 208 and 210 of a second training task.

In step 207, path predictor 141 accepts encoded sequence 131 as input and infers inferred traversal path 151 as discussed earlier herein. In step 208, token predictor 142 predicts next token 172 as discussed earlier herein.

For path predictor 141, step 209 self-supervised measures a training loss as self-supervised loss 161 between traversal paths 150-151 that are two frequency distributions as discussed earlier herein.

For token predictor 142, step 210 self-supervised measures self-supervised training loss 162 that is not based on traversal paths 150-151 nor based on graph 105 as discussed earlier herein. Step 210 uses next lexical token 123 as a self-supervision label that will be used to self-supervised train machine learning models 130 and 141-142 as follows.

Step 211 combines self-supervised training losses 161-162 to generate a combined training loss that is used to increase the accuracy of machine learning models 130 and 141-142. These increases in accuracy occur by error propagation in step 211 that propagates the combined loss into machine learning models 130 and 141-142, which occurs regardless of whether a machine learning model is neural or not. For a neural network, error propagation may be neural backpropagation. As discussed elsewhere herein, error propagation embodiments may entail step 211 adjusting values (e.g. coefficients, connection weights or, for example, a decision tree topology) that are internally retained in the machine learning model.

2.1 Model Lifecycle

As discussed above, subsequence 195 slides one increment (i.e. one token) per iteration. A current iteration may finish by performing step 211 and, as shown by the back arrow, a next iteration may begin by repeating step 204 (and steps 205-211). Even though data 131, 150-151, 161-162, and 172 are contextual (i.e. dependent on the current contents of subsequence 195), data 131, 150-151, 161-162, and 172 are generated and then discarded in each iteration. In that way, data 131, 150-151, 161-162, and 172 are stateless (i.e. do not depend on a previous iteration).

If current subsequence 195 contains the last token in sequence of lexical tokens 190, then step 211 is not followed by a next iteration. In that case, processing of current sequence of lexical tokens 190 and current lexical text 180 is finished.

When processing current lexical text 180 is finished, processing a next lexical text in the training corpus may begin. In that case and although not shown, step 211 may be followed by step 202 (and steps 203-211) for the next lexical text.

Herein a training epoch performed by the process of FIG. 2 may entail processing some or all lexical texts in the training corpus at least once, and there may be a sequence of epochs until a stopping condition occurs, which halts pretraining and halts the process of FIG. 2. Depending on the embodiment, a stopping condition may be any of: a count of epochs, a count of repetitions of step 202, a count of repetitions of step 206, elapsed time, a desired accuracy of token predictor 142, or convergence (i.e. a plateau in the accuracy of token predictor 142).

After pretraining, path predictor 141 may be discarded and, for example on another computer in another environment owned by a same or different party, finetuning or production use may occur. In finetuning or production, sequence encoder 130 can be deployed with or without token predictor 142, but token predictor 142 should not be deployed without sequence encoder 130. In some embodiments, finetuning may be single task, single shot, and/or not multibranch. In any case, finetuning and pretraining use disjoint (i.e. non-overlapping, independent) training corpuses.

If production deployment lacks path predictor 141 that required at least syntactic validity of lexical text 180, sequence of lexical tokens 190 may, in production, represent a new (e.g. interactively being edited) lexical text that is syntactically and/or semantically invalid.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
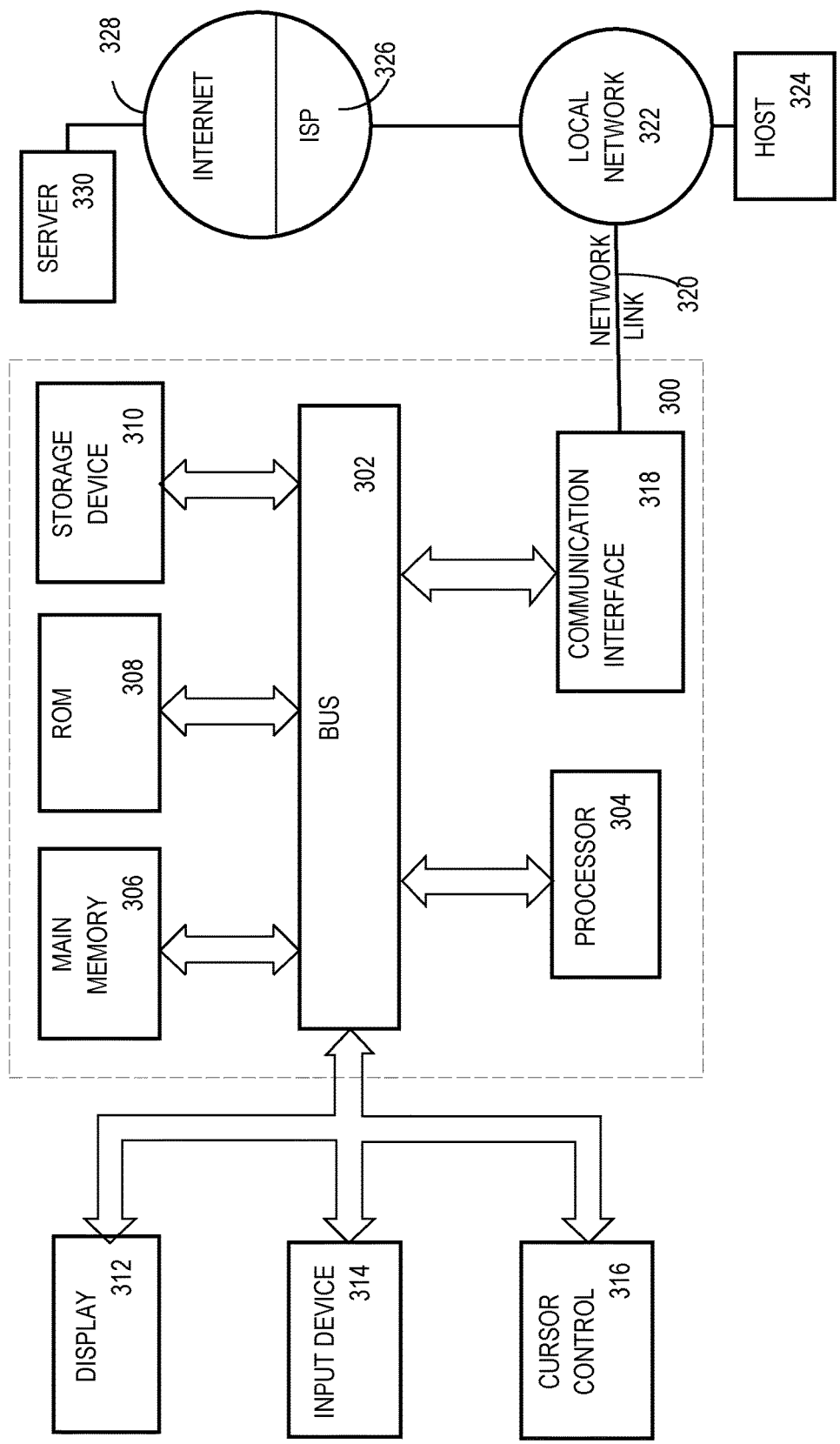
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) is presented herein.

Machine Learning Models

A machine learning model is trained using a particular machine learning algorithm. Once trained, input is applied to the machine learning model to make a prediction, which may also be referred to herein as a predicted output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a token sequence encoder that is trainable and untrained;
   generating a sequence of lexical tokens that represents a lexical text;
   generating a graph that represents the lexical text;
   inferring from a subsequence of the sequence of lexical tokens, by the token sequence encoder, an encoded sequence that represents the subsequence of the sequence of lexical tokens;
   predicting, from the encoded sequence that represents the subsequence of the sequence of lexical tokens, a predicted traversal path that represents a next lexical token that occurs next in the sequence of lexical tokens adjacent to the subsequence of the sequence of lexical tokens; and adjusting the token sequence encoder based on the predicted traversal path that represents the next lexical token.

2. The method of claim 1 further comprising self-supervised training:
   a first machine learning model that accepts as input the encoded sequence that represents the subsequence of the sequence of lexical tokens, and
   a second machine learning model that accepts as input the encoded sequence that represents the subsequence of the sequence of lexical tokens.

3. The method of claim 2 further comprising:
   measuring, for the first machine learning model, a first training loss that is based on the predicted traversal path that represents the next lexical token;
   measuring, for the second machine learning model, a second training loss that is not based on the predicted traversal path that represents the next lexical token.

4. The method of claim 2 further comprising predicting, by the second machine learning model, a lexical token that occurs next in the sequence of lexical tokens adjacent to the subsequence of the sequence of lexical tokens.

5. The method of claim 4 further comprising:
   deploying into a production environment, without the first machine learning model, the token sequence encoder and the second machine learning model;
   predicting, by the second machine learning model, a lexical token that occurs next in a new sequence of lexical tokens that represents a new lexical text that is syntactically invalid.

6. The method of claim 1 further comprising counting occurrences of a particular sub-path in a traversal path that represents said next lexical token.

7. The method of claim 1 wherein the predicted traversal path comprises at least one selected from a group consisting of:
   a multilabel frequency distribution,
   an indication that a particular sub-path does not occur, and
   an indication that a first sub-path is more frequent than a second sub-path that has a same length as the first sub-path.

8. The method of claim 1 further comprising selecting the subsequence of the sequence of lexical tokens by sliding a fixed-length window over the sequence of lexical tokens that represents the lexical text.

9. The method of claim 1 wherein:
   the method further comprises multitask learning by the token sequence encoder;
   said inferring the encoded sequence that represents the subsequence of the sequence of lexical tokens and said adjusting the token sequence encoder occur during said multitask learning by the token sequence encoder.

10. The method of claim 1 wherein the graph is at least one selected from a group consisting of a directed acyclic graph (DAG), a dataflow graph, an abstract syntax tree (AST), and an imbalanced tree.

11. One or more non-transitory computer-readable media storing instructions that, when executed by one or more processors, cause:
    generating a token sequence encoder that is trainable and untrained;
    generating a sequence of lexical tokens that represents a lexical text;
    generating a graph that represents the lexical text;
    inferring from a subsequence of the sequence of lexical tokens, by the token sequence encoder, an encoded sequence that represents the subsequence of the sequence of lexical tokens;
    predicting, from the encoded sequence that represents the subsequence of the sequence of lexical tokens, a predicted traversal path that represents a next lexical token that occurs next in the sequence of lexical tokens adjacent to the subsequence of the sequence of lexical tokens; and
    adjusting the token sequence encoder based on the predicted traversal path that represents the next lexical token.

12. The one or more non-transitory computer-readable media of claim 11 wherein the instructions further cause self-supervised training:
    a first machine learning model that accepts as input the encoded sequence that represents the subsequence of the sequence of lexical tokens, and
    a second machine learning model that accepts as input the encoded sequence that represents the subsequence of the sequence of lexical tokens.

13. The one or more non-transitory computer-readable media of claim 12 wherein the instructions further cause:
    measuring, for the first machine learning model, a first training loss that is based on the predicted traversal path that represents the next lexical token;
    measuring, for the second machine learning model, a second training loss that is not based on the predicted traversal path that represents the next lexical token.

14. The one or more non-transitory computer-readable media of claim 12 wherein the instructions further cause predicting, by the second machine learning model, a lexical token that occurs next in the sequence of lexical tokens adjacent to the subsequence of the sequence of lexical tokens.

15. The one or more non-transitory computer-readable media of claim 14 wherein the instructions further cause:
    deploying into a production environment, without the first machine learning model, the token sequence encoder and the second machine learning model;
    predicting, by the second machine learning model, a lexical token that occurs next in a new sequence of lexical tokens that represents a new lexical text that is syntactically invalid.

16. The one or more non-transitory computer-readable media of claim 11 wherein the instructions further cause counting occurrences of a particular sub-path in a traversal path that represents said next lexical token.

17. The one or more non-transitory computer-readable media of claim 11 wherein the predicted traversal path comprises at least one selected from a group consisting of:
    a multilabel frequency distribution,
    an indication that a particular sub-path does not occur, and
    an indication that a first sub-path is more frequent than a second sub-path that has a same length as the first sub-path.

18. The one or more non-transitory computer-readable media of claim 11 wherein the instructions further cause selecting the subsequence of the sequence of lexical tokens by sliding a fixed-length window over the sequence of lexical tokens that represents the lexical text.

19. The one or more non-transitory computer-readable media of claim 11 wherein:
    the instructions further cause multitask learning by the token sequence encoder;
    said inferring the encoded sequence that represents the subsequence of the sequence of lexical tokens and said adjusting the token sequence encoder occur during said multitask learning by the token sequence encoder.

20. The one or more non-transitory computer-readable media of claim 11 wherein the graph is at least one selected from a group consisting of a directed acyclic graph (DAG), a dataflow graph, an abstract syntax tree (AST), and an imbalanced tree.

* * * * *